United States Patent [19]

Fulton

[11] Patent Number: 4,928,133
[45] Date of Patent: May 22, 1990

[54] PRINTER AND METHOD

[75] Inventor: Alfred L. Fulton, Huntsville, Ala.

[73] Assignee: SCI Systems, Inc., Huntsville, Ala.

[21] Appl. No.: 306,804

[22] Filed: Feb. 3, 1989

[51] Int. Cl.$^5$ .............................................. G01J 15/00
[52] U.S. Cl. .................................. 346/150; 235/31 R
[58] Field of Search .............................. 364/518–523, 364/407; 346/159, 150, 154, 153.1, 136, 74.2; 235/31 R, 31 T; 271/110, 111

[56] References Cited

U.S. PATENT DOCUMENTS

| | | | |
|---|---|---|---|
| 3,794,966 | 2/1974 | Platzman | 235/31 |
| 4,196,450 | 4/1980 | Miller et al. | 364/523 |
| 4,275,456 | 6/1981 | Tanaka et al. | 364/900 |
| 4,322,612 | 3/1982 | Lange et al. | 235/419 |
| 4,373,726 | 2/1983 | Churchill et al. | 273/138 A |
| 4,375,189 | 3/1983 | Berner et al. | 101/68 |
| 4,494,197 | 1/1985 | Troy et al. | 364/412 |
| 4,652,998 | 3/1987 | Koza et al. | 364/412 |
| 4,677,553 | 6/1987 | Roberts et al. | 364/412 |
| 4,689,742 | 8/1987 | Troy et al. | 364/412 |
| 4,704,518 | 11/1987 | Brunn et al. | 235/480 |
| 4,716,799 | 1/1988 | Hartmann et al. | 83/42 |
| 4,832,341 | 5/1989 | Muller et al. | 273/139 |

*Primary Examiner*—Arthur G. Evans

[57] ABSTRACT

The printer utilizes a high-speed data print engine to print documents such as airline tickets. Preferably, the printer is part of a machine which is operated by a credit-card or the like so that the machine serves as a customer-operated ticket issuing terminal. The ticket blanks preferably are in fan-fold form, with perforations between them. An improved separator or "burster" is provided for separating the ticket blanks from one another. The burster has an arm which is moved rapidly across the path of travel of the ticket blanks at or near the location of the perforation, while a drive roller mechanism holds the blanks against longitudinal slippage during bursting. Preferably, the printed ticket coupons in each batch of tickets are collected in a bin inside the machine until it is determined that the batch is complete. Only then are the tickets delivered outside the machine to the purchaser. If the batch is not complete, the printed tickets forming the incomplete batch are delivered to a safe storage box inside the machine so that the ticket blanks can be accounted for. A device is provided to record-reproduce data on a magnetic strip on each ticket. A drive roller and driven belt combination are used to move the ticket smoothly past a record-/reproduce head.

40 Claims, 7 Drawing Sheets

PRINTER AND METHOD

This invention relates to printers, and particularly to data printers. Preferably the printer is used for printing tickets such as vehicular transportion tickets—specifically, airline tickets, or tickets to plays, concerts, sporting events, etc. The invention particularly relates to customer-operable vending machines for such tickets.

A highly sophisticated, high-speed printer for printing two types of vehicular transportation coupons, such as airline tickets and automobile or hotel reservation coupons, is shown in U.S. patent applications Ser. No. 051,046, filed May 15, 1987; Ser. No. 183,004, filed Apr. 18, 1988; Ser. No. 193,352, filed May 12, 1988; and Ser. No. 193,747 filed May 12, 1988, all of which are assigned to the same assignee as this patent application. Such a printer uses pre-cut coupon blanks and cannot use fan-fold blanks.

In many applications, where two different coupon blanks need not be printed in the same printer, the printer shown in the above patent applications can be simplified and its manufacturing cost reduced by using fan-fold ticket coupons instead of individual coupon blanks. Such blanks are delineated from one another by perforations in the card stock strip forming the blanks.

One of the problems with prior printers using such fan-fold blanks is that the mechanism used to cut the ticket blanks apart has not been entirely reliable. As a result, machines using such blanks in the past have been subject to relatively frequent malfunction.

Therefore it is one of the objects of the present invention to provide a printer, particularly a ticket printer, using fan-fold perforated stock with a reliable separator to separate the blanks.

Another problem exists in airline ticket printers utilized to issue tickets in response to the insertion of cash or a credit card by a customer. Where the transportation tickets have multiple parts, such as where a separate ticket must be issued for each leg of a multi-leg journey, none of the tickets should be issued to the customer until the entire batch has been properly printed. Furthermore, if one or more tickets has been printed but not issued to the customer, it should be saved because each airline ticket blank must be accounted for.

Therefore, it is another object of the invention to provide a ticket vending machine which will issue tickets to a customer only when a complete batch has been printed and verified, and which saves all tickets which have been printed but not issued.

Another problem is created in reading data from or recording data on a magnetic stripe or the ticket blanks. The cards sometimes "jitter" as they move past the magnetic record/reproduce head and impair the fidelity of the recording or reproduction.

Accordingly, a further object of the invention is to provide jitter-free transportation for the ticket blanks though the magnetic recording/reproduction device.

It is a further object of the invention to provide a relatively simple printer which has relatively low manufacturing cost, and yet operates at high speed and is very reliable and inexpensive to operate.

In accordance with the present invention, the foregoing objectives have been met, in part, by the provision of a relatively reliable, simple and fast-acting separator or burster mechanism. The burster mechanism has an arm which moves rapidly through the path of the blanks in the area of the perforations so as to tear or "burst" the coupons apart at the perforations. The coupons are held against longitudinal slippage during the bursting operation. The burster preferably operates by striking the surface of the ticket blank strip at one edge and pressing on the strip progressively along the width thereof until a tear along the perforation has been completed. The blanks preferably are held by the simple expedient of positioning drive rollers on either side of the position of the burst, and coupling them together so that they can rotate only in the same direction, and not in opposite directions at the same time.

The objects of the invention additionally are satisfied by the provision of means for storing printed documents such as ticket coupons as they issue from the printer in a compartment from which they are ejected to the outside of the machine only after all coupons in a batch have been printed. If, for example, a customer withdraws his credit card from the machine too soon, or if the machine malfunctions during printing of a batch, none of the coupons in the incomplete batch will be issued. Instead, they will be shunted into a safe storage receptacle in the printer, where they can be accounted for properly.

Further objects of the invention are met by the provision of a mechanism for moving a card with a magnetic recording area past a magnetic transducer by means of a drive roller and belt combination in which the card itself, under the impetus of the drive roller, drives the belt and an idler roller to ensure that the parts move at the same speed, without jitter.

The resulting printer is simpler, less expensive to manufacture and more reliable in operation than similar prior printers. Furthermore, the printer offers added security in that, when it is used as a customer-operated ticket dispenser, it will not issue valuable printed tickets to the customer unless the entire printing process has been completed successfully and full payment has been made for the tickets, and saves the printed but unissued tickets so that they can be accounted for. The recording and reading of data to and from the magnetic recording area on the ticket is essentially jitter-free.

The foregoing and other objects and advantages of the invention will be set forth in or apparent from the following description and drawings.

GENERAL DESCRIPTION

Figures 1, 2:
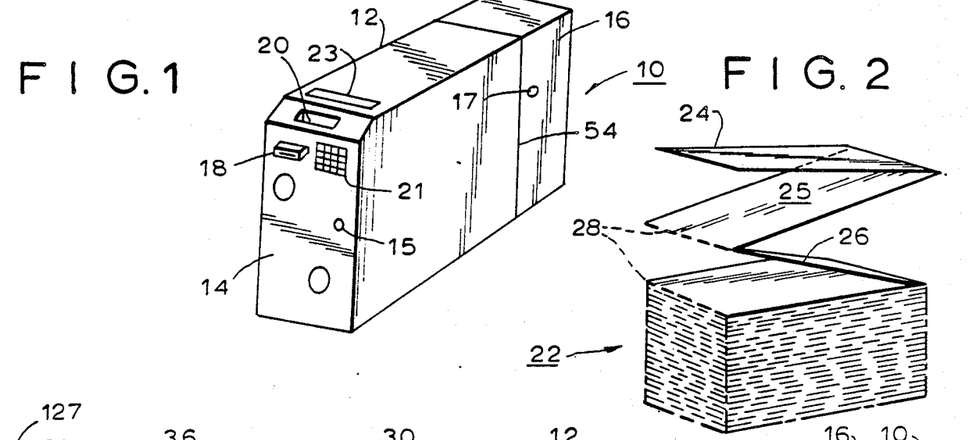
FIG. 1 is a perspective view of a ticket vending machine embodying the present invention.
FIG. 2 is a perspective, partially-schematic view of a fan-folded strip of ticket blanks used in the printer of the invention.

FIG. 1 shows a ticket vending machine 10 for use in such places as airline, railroad and bus terminals to sell vehicular transportation tickets to customers who do not have the time to wait for attendants, or wherever it is advantageous to use such a vending machine.

The machine 10 also is useful in issuing other types of coupons or tickets. For example, it can be used to issue parimutuel tickets at a race track; movie, theater or sporting event tickets, either at the site of the movie or event, or at a convenient central location such as a train or airline terminal, etc. Since the machine uses a single supply of blank ticket stock, and prints each individual ticket on-site, the machine can be used to print and issue tickets for transportation to a substantial number of different destinations, with different classes of seats, etc. Similarly, one machine can be used to issue tickets to a wide variety of different events.

The machine 10 includes a secure metal housing 12 with a removable front panel 14 and a removable rear section 16. The front panel 14 preferably is hinged and secured by a lock 15 to the rest of the housing. The internal components of the machine preferably are mounted on rollers 33 (see FIG. 3). When unlocked, and the internal mechanism of the machine can be rolled out from the remainder of the housing to facilitate servicing.

Similarly, the rear section 16 of the housing is locked by means of a lock 17 to the remainder of the housing and can be removed and replaced in order to facilitate the replenishment of the supply of ticket blanks in the machine.

The machine 10 has a credit card or paper currency receiver 18, a ticket-issuing opening 20, a keypad or keyboard 21 for data entry, and a display screen 23.

As it is shown in FIG. 2, the printer 10 uses a supply 22 of fan-folded ticket blanks in the form of one long, continuous strip of card stock in which the separate blanks are delineated from one another by perforation lines, such as lines 28. The blanks are folded along the lines 28.

Figure 10:
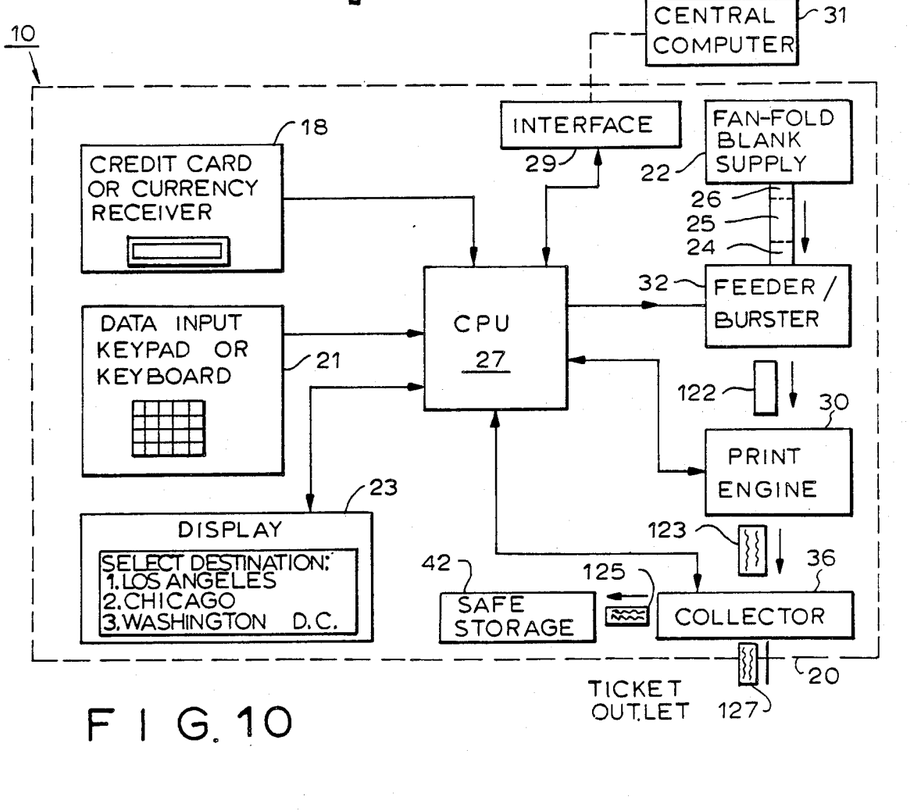
FIG. 10 is a schematic block diagram of the electrical control and mechanical feed system of the machine shown in FIGS. 1 through 8.

The overall operation of the machine 10 is illustrated schematically in FIG. 10.

Now referring to FIG. 10, the customer inserts his or her credit card or currency into the receiver 18. In the following description, it will be assumed that the customer uses a credit card, and that the machine is adapted to accept credit cards as a means of compensation.

The receiver 18 immediately starts performing a credit card check such as by dialing up a central credit information source through a modem and telephone lines (not shown) in a conventional manner to determine whether the credit card is valid, what the credit limits of the owner are, whether it has been stolen, etc. The credit card validity and information are sent to the CPU 27 of a computer in the machine for later use.

In the meantime, while the credit check is being run, the CPU delivers to the visual display 23 instructions to the customer as to the data which he or she must enter in order for the machine to issue the desired tickets. The computer of the machine is programmed so as to display a series of "prompt" messages such as "select destination". In response to the prompt, the customer inputs data by means of the keypad or keyboard 21. In response to each input operation, the computer delivers another prompt message on the display for the next step to be taken by the customer, or, when all the required information has been input and the credit card check has been completed, the computer starts the printing and issuing of the tickets ordered.

The computer 27 is connected through an interface unit 29 to a remote central computer 31 which stores and distributes seat availability and other information, and controls the printing operations, as it is explained more fully in the above-identified patent applications.

The size and type of display 23 which is used depends upon the purpose of the display and the amount of information desired to be displayed at any one time. The display can comprise, for example, a video screen; a LED display; or a LCD display. Other displays can be used as alternatives.

The machine 10 also can be used as a stand-alone vending machine which is not connected to a central computer. Such a machine is particularly useful in operations such as shuttle services in which seat availability is not checked in advance of selling a ticket.

It should be understood that the data input keypad or keyboard 21 and the display 23 are optional features. If the ticket vending machine is intended to issue only one type of ticket to only one designation, and offers no variations for which customer data input is required, then these features can be eliminated.

The machine 10 also can be used simply as a ticket printer, without the credit card or currency receiver, data input keypad or keyboard, or display. It can be used in that form in airline, railroad or bus ticket agent counters, travel agencies, or entertainment ticket selling agencies, either connected to a central computer or not, together with a separate keyboard and display normally available in such locations.

Still referring to FIG. 10, when the credit check is complete and all required data has been input, the computer signals the feeder/burster unit 32 to start feeding ticket blanks and separating them to form separate blanks, such as the blank 122, and send the blanks one-by-one to the print engine 30. The print engine is instructed by the computer to print the required information on the ticket, and issues the printed ticket 123 into a collector compartment 36, which is sometimes referred to herein as an "escrow bin".

Each customer order may require the printing of several different tickets. For example, a single customer order for round-trip tickets between two cities may require travel in two different "legs" (on two different flights) in each direction, thus requiring four separate tickets. The collector 36 holds each printed ticket as it is completed. When the computer verifies that this has happened, then, and only then, the collector is instructed to issue the tickets through the outlet opening 20 in the machine. The issued tickets are shown at 127.

If the batch of tickets remains incomplete for some reason, such as the customer removing his credit card from the machine too soon, or malfunction, then the tickets 125 printed in the incomplete batch are shunted into a safe storage receptacle 42 where they are held in the machine so that they can be accounted for later. Each printed ticket has an intrinsic value, and must be carefully safeguarded. Furthermore, airline ticket blanks and other ticket blanks usually are carefully counted and must be accounted for. Therefore, personnel can count the rejected tickets in the safe storage receptacle 42 and properly account for usage of the ticket blanks.

PRINTER MECHANISM ASSEMBLY

Figure 3:
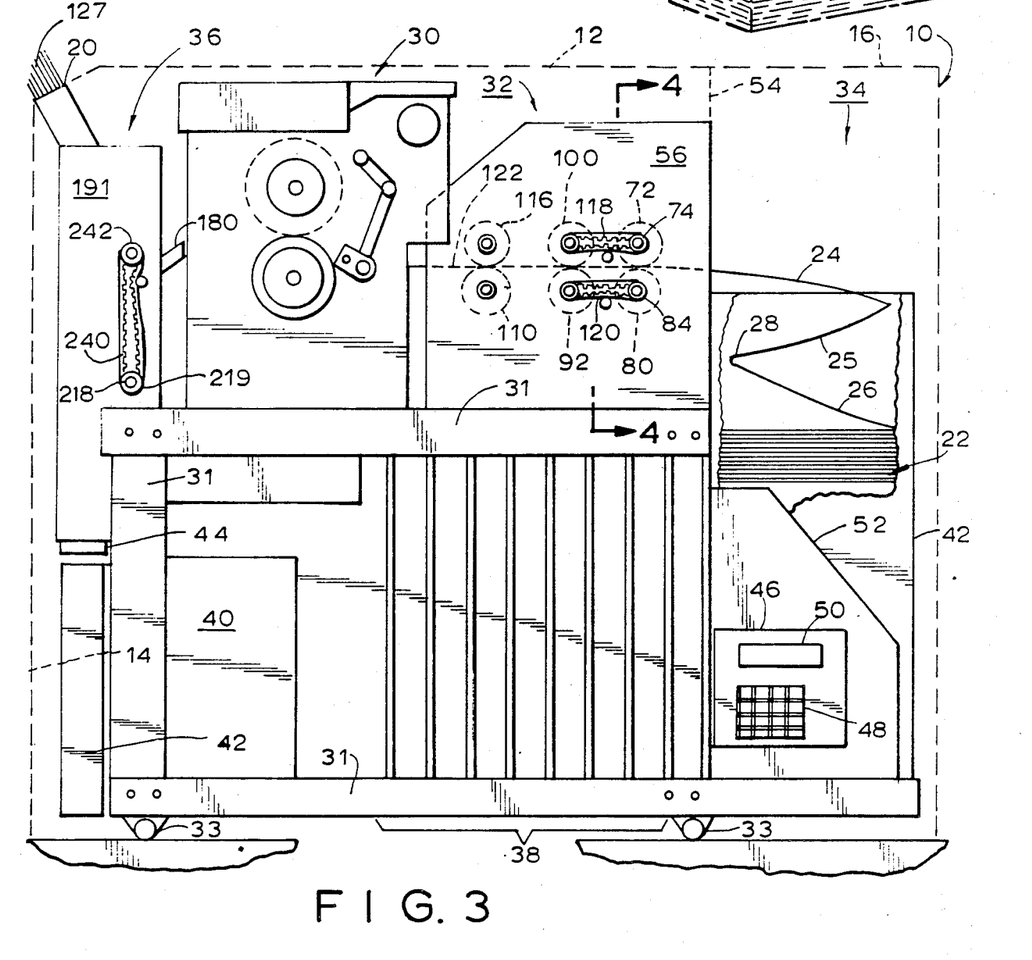
FIG. 3 is a side elevation view, partially broken-away and partially schematic, of the internal components of the machine shown in FIG. 1.

FIG. 3 is a side elevation view of the internal mechanism of the machine 10. The mechanism includes a frame 31 made of aluminum angle or the like.

A card stock supply section 34 includes vertical plates 52 and the rear frame angle section in the lower right-hand portion of FIG. 3 which form side supports and guides for a box 42 (shown partially broken-away) containing the supply 22 of fan-fold ticket blanks. Conveniently, when changing blank supplies, one merely need remove the rear cover 16, remove the empty box 42, insert a full box in its place, and thread the free end of the top blank 24 into the nip of a set of infeed rollers 72 and 80 (also see FIGS. 7 and 8) in a feeder/burster unit 32. Then, the housing portion 16 is replaced and locked.

The feeder mechanism in the feeder/burster unit 32 feeds the ticket blank strip from the supply, bursts the individual tickets apart, and sends them, one-by-one, into the print engine 30.

The print engine 30 preferably is an ion deposition type of printer, which is more fully described in the above-identified copending patent applications, and in other prior art patents. Those disclosures hereby are incorporated herein by reference. The print engine 30 rapidly prints the required data and information on the ticket blank and pushes it into an inlet guide 180 to the collector 36. When a complete batch has been printed, the collector 36 pushes the printed tickets vertically upwardly where they come to rest in an outlet receptacle with their ends extending put of the ticket opening 20 in the machine, as shown at 127 in FIG. 3.

An electrically-operable gate 44 forms the bottom of the collector 36. When a batch of tickets is incomplete, the tickets in the batch are dropped downwardly into the safe storage bin 42 by movement of the gate member 44 away from the bottom of the collector 36.

Also mounted in the machine shown in FIG. 3 is an electrical power supply 40, and a rack 38 of printed circuit cards including the CPU 27 and other control circuitry for the printing equipment. A control panel 46 is provided with a display 50 and keypad 48 for use in programming, diagnostic work, etc.

As noted above, the mechanism shown in FIG. 3 preferably is mounted on rollers 33 so that the internal mechanism can be rolled out of the rest of the housing for ease of servicing.

FEEDER/BURSTER

Figures 4, 5, 6:
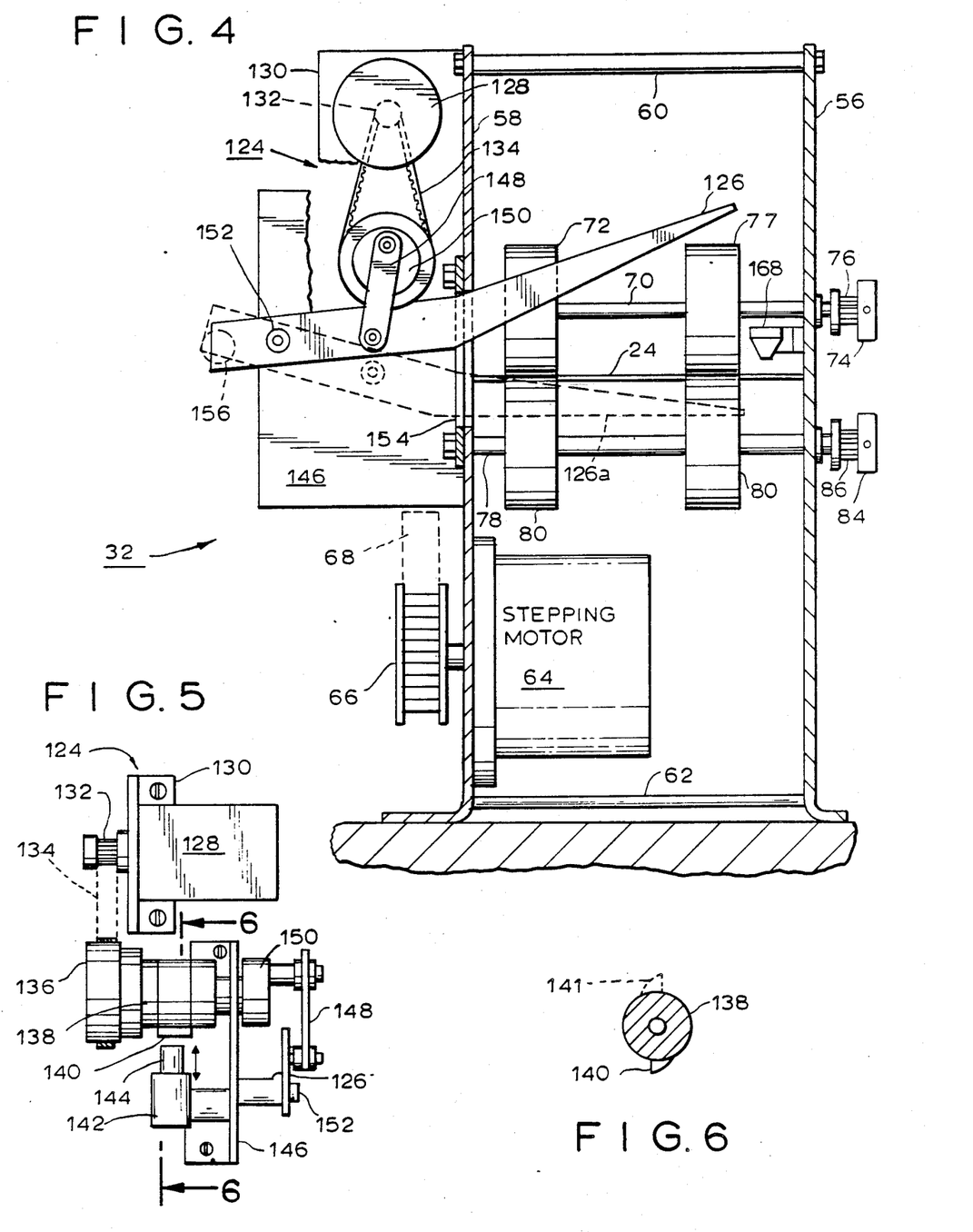
FIG. 4 is a cross-sectional, partially broken away and partially schematic view of the separator or burster mechanism of the device shown in FIGS. 1 and 3, with the section being taken along line 4—4 of FIG. 3.
FIG. 5 is a side elevation view of a portion of the mechanism of FIG. 4, showing the operation and construction of the burster arm operating mechanism.
FIG. 6 is a cross-sectional view of a portion of the mechanism shown in FIG. 5, taken along line 6—6 of FIG. 5.
Figure 7:
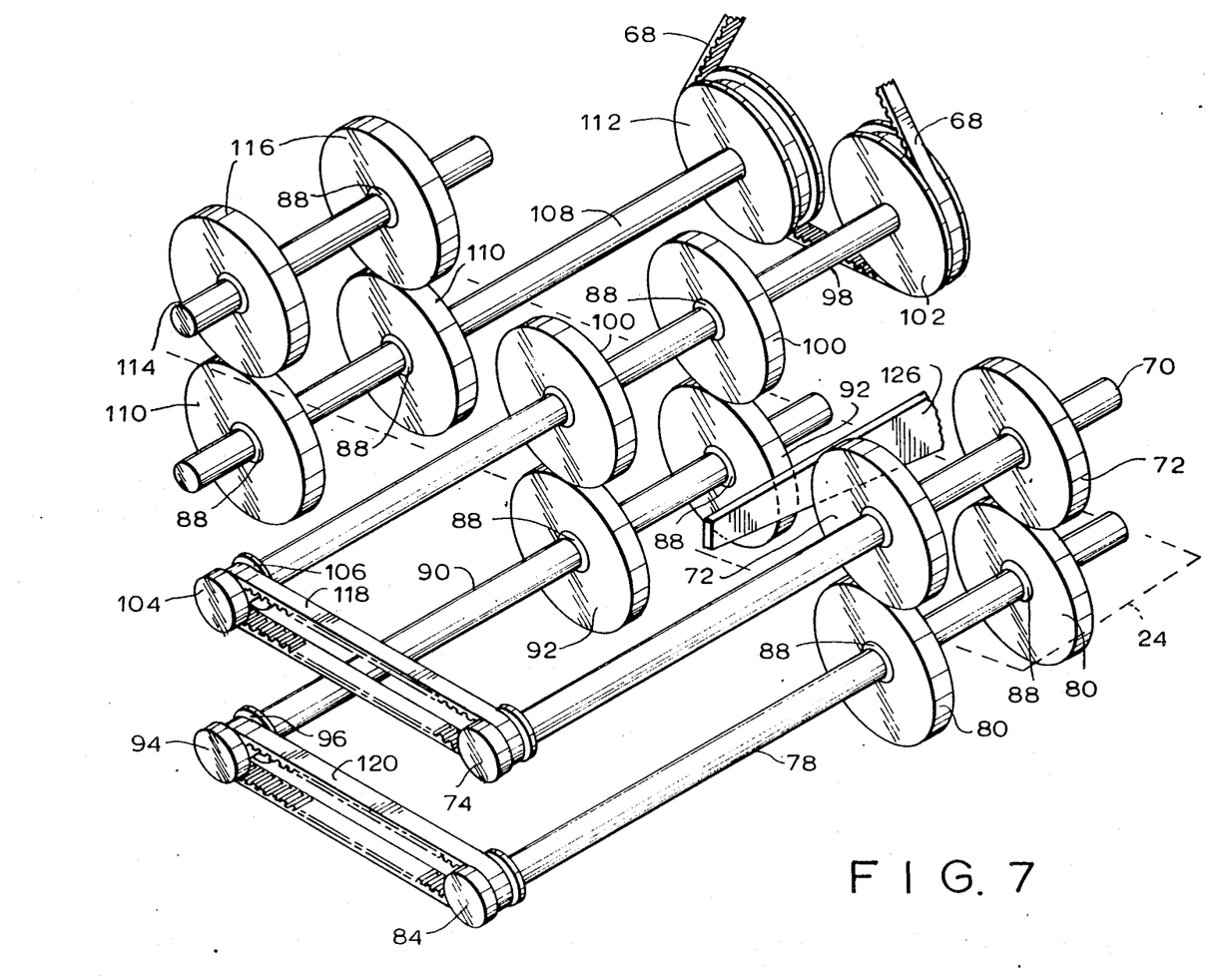
FIG. 7 is a perspective schematic view of a portion of the burster mechanism shown in FIGS. 3 through 6.
Figure 8:
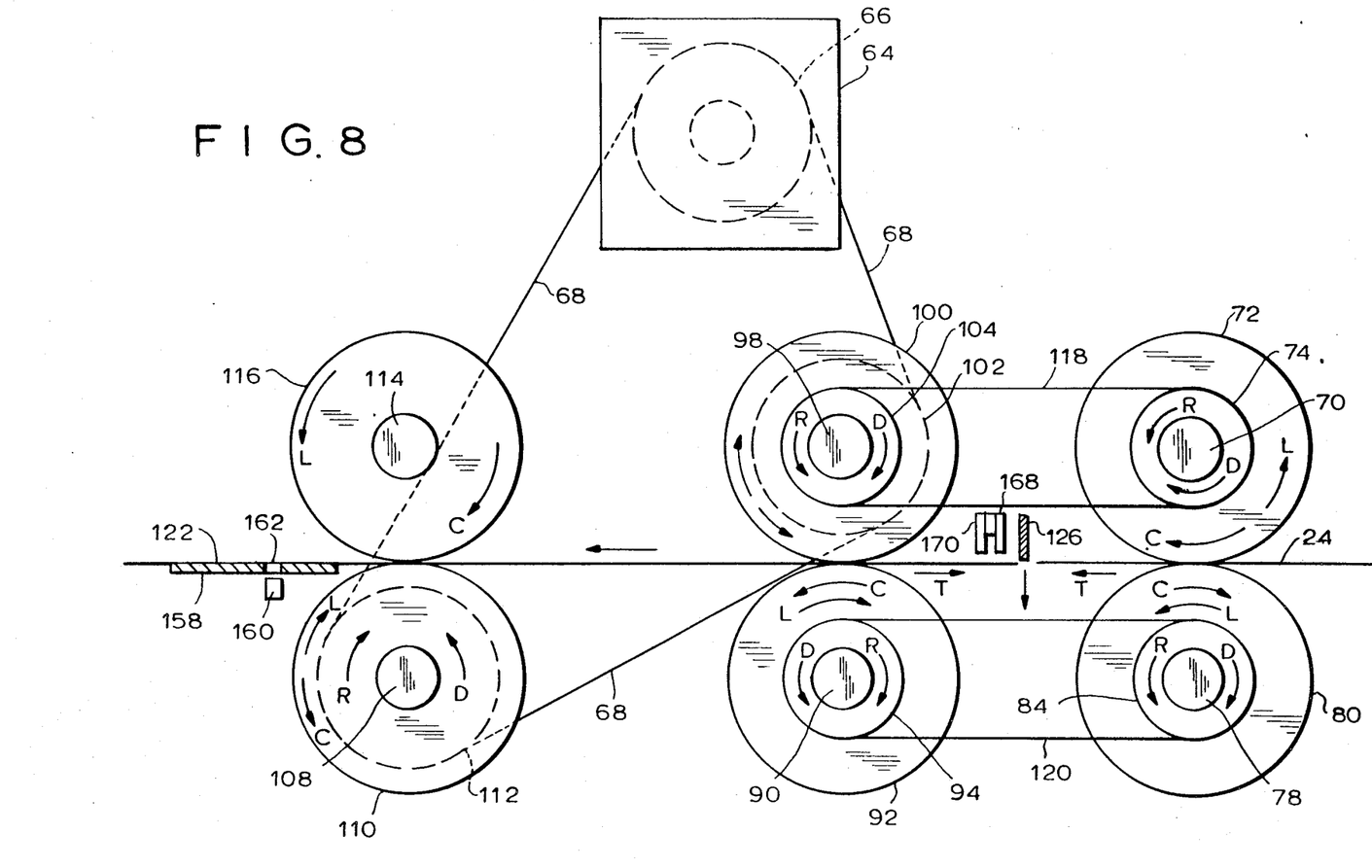
FIG. 8 is a side elevation schematic view illustrating the operation of a portion of the burster mechanism shown in FIGS. 3 through 7.

The feeder/burster unit 32 is shown in FIGS. 4 through 8, as well as in FIG. 3. FIG. 4 is a cross-sectional view, partially broken away and schematic, taken along the line 4—4 of FIG. 3. FIGS. 7 and 8 are, respectively, perspective and side elevation views, partially schematic, illustrating the operation of the feeder/burster device 32.

Referring now primarily to FIG. 4, the unit 32 includes a pair of side plates 56 and 58 held in spaced-apart relationship by a plurality of stand-off rods such as 60 and 62. A plurality of shafts such as shafts 70 and 78 shown in FIG. 4 are rotatably mounted and extend between the plates 56 and 58.

Secured to the plate 58 is a stepping motor 64 driving a toothed drive pulley 66 and toothed drive belt 68. Although the motor 64 actually is located below the shaft and rollers, as it is shown in FIG. 4, it is shown in FIG. 8 located above the rollers and shafts, for the sake of convenience in the drawings. The principle of operation is not changed by the actual location of the motor. Similarly, in FIG. 7, the drive belt 68 is shown extending upwardly towards the motor, which is not illustrated in FIG. 7, even though it actually is located downwardly as illustrated in FIG. 4.

Referring now principally to FIGS. 7 and 8, the feed rollers include a first set of infeed rollers 72 and 80 mounted, respectively, on shafts 70 and 78. Also included is a second set of infeed rollers 100 and 92 mounted, respectively, on shafts 98 and 90, and a set of outfeed rollers 110 and 116 which are mounted on shafts 108 and 114, respectively.

Referring now primarily to FIG. 7, toothed drive pulleys 102 and 112 are secured to the right ends of shafts 98 and 108, respectively, and mate with the toothed drive belt 68.

Referring again to FIG. 7, secured to the left ends of shafts 98, 90, 70 and 78, respectively, are toothed pulleys 104, 94, 74, and 84. A first toothed belt 118 meshes with and drivably couples together pulleys 104 and 74. Similarly, another toothed belt 120 meshes with and drivably couples the pulleys 84 and 94 together. The teeth on these belts, as well as the belt 68 are continuous, but only a few teeth are shown in the drawings for the sake of convenience and clarity of illustration.

As it is shown in FIG. 7, each set of rollers bearing a single reference number such as 72, 80, 100, etc., actually comprises two separate rolls spaced apart on the same shaft, with the rollers being located close to opposite edges of the card strip (see FIG. 4).

The upper rollers 100 and 72 and the lower outfeed rollers 110 are made of a relatively hard (60 durometer) nitrile material. They define the plane of movement of the card stock with a relatively high degree of accuracy.

The lower rollers 80 and 92, and the upper outfeed rollers 116 are made of relatively soft (e.g. 20 durometer) elastomer compression material. The spacing between shafts in mating roller pairs such as 72 and 80 is set so as to cause the surface of the soft roller to be indented by around 0.050 inch to insure a substantial amount of compressive contact between the rollers so as to firmly grip the card stock.

Each of the rollers is mounted on its shaft by way of a one-way ("overrunning") clutch which is pressed into the roller. The sense of each of these clutches, that is, the direction of relative rotation between the roller and the shaft which causes engagement and disengagement, is indicated by the symbols used in FIG. 8.

In FIG. 8, the symbol "D" next to an arrow indicates the direction in which rotation of the pulley and shaft engages the clutch and locks the roller onto the shaft.

The symbol "R" next to an arrow indicates the direction of rotation of a pulley and shaft which releases the clutch; that is, unlocks the shaft from the roller.

The symbol "L" next to an arrow indicates the direction in which the roller can be rotated to engage the clutch to lock the roller to the shaft.

The symbol "C" next to an arrow indicates the direction in which a roller can be rotated in order to unlock the roller from the shaft so that the roller is free to rotate on the shaft.

As is shown schematically in FIG. 8, and also in FIGS. 4 and 7, a burster blade 126 is poised above the path of travel of card stock between the nips of the rollers. Also located above that path, as is best shown in FIG. 8, are a pair of sensors 168 and 170. The sensor or detector 168 is a gap detector to detect the gap formed by the separation of a blank 122 from the strip. The signal from the detector 168 is used to enable the outfeed of the blank 122 and enable the feeding of the blank into the print engine 30.

The sensor 170 detects the leading edge of the card stock strip as it enters the feeder/burster. The sensor or detector 170 then starts a counter which counts the number of steps rotated by the stepping motor 64 to indicate when the lead blank 24 has traveled far enough through the rollers so that the perforation between the blank 24 and the succeeding blank 25 is located approximately beneath burster blade 126, at which time the burster blade 126 moves downwardly through the path of travel of the strip to burst apart the lead blank 24 from its successor 25, and then returns to its starting position.

Support plate 158 is positioned at the outfeed from rollers 110 and 116. A sensor 160 senses the movement of the trailing edge of a blank past it. The sensor senses the blank through a hole 162 in the plate 158 to signal the control circuitry that a blank has been properly fed to the print engine. If a signal from any of sensors 160, 168 or 170 is not received, the control system automatically shuts the machine down for servicing.

The sensors 168, 170 and 160 all are of a well known variety such as those which emit infrared radiation and have a photodetector which detects reflected radiation. Each such sensor is able to tell the difference between the amount of radiation reflected by card stock and no card stock, thus detecting the presence or absence of a card at its respective position.

CARD FEEDING OPERATION

The feeding of blank forms or cards in strip form now will be described.

Referring to FIG. 8, the leading edge of the new card 24 of a new supply 22 of forms initially is pushed into the nip of infeed rollers 72 and 80 by hand. The clutches and belts of the infeed roller sets operate together to allow insertion of the card into the nip of rollers 78 and 0 freely. After initial insertion, the card 24 is pulled into the unit 32 by means of the stepping motor 64 through the pulley 104 and the toothed belt 118 which drives the shaft 70 in a clockwise direction. This locks the clutches for the rollers 72.

The clockwise rotation of rollers 72 drives rollers 80 in a counterclockwise direction so as to lock the clutches for rollers 80 to the shaft 78. This causes the belt 120 to drive the pulley 94 on the shaft 90 to rotate it in a counterclockwise direction too. Thus, the rollers 72, 80, 92 and 100 act as infeed rollers to move the leading edge of the card strip towards the left in FIG. 8.

Rotation of the outfeed rollers 110 by the stepping motor in the clockwise direction frees the rollers 110 from their shafts. The card 24 is pushed by the infeed rollers into the nip of the rolls 110 and 116 and rotates them because they are free-wheeling on their shafts at this time.

When the leading edge of the first card passes sensor 170, the control circuitry starts counting pulses from the stepping motor 64. When a number of pulses preset in accordance with the length of the ticket blank has been counted, the motor 64 comes to a stop. Optionally, an electrical holding current can be applied to the motor to hold it in a stationary position to assure it will not move until it is desired for it to move. At this time, the burster blade actuating mechanism, to be described below, moves the blade 126 rapidly downwardly through the path of travel of the card stock and up again to its initial position.

As it is shown in FIG. 8, the blade 126 is dull; it does not cut the card stock when it passes through it. Instead, it tears the material at the perforation.

As it can be understood from the showing of FIG. 4, when the blade contacts the card stock, the blade forms an angle with the plane of the stock, and passes through the material to its lowermost position, shown in dashed outline at 126a, always at an angle to the plane of the card stock. Thus, it makes contact with the left edge of the card material as shown in FIG. 4 first and makes contact with the remainder of the material progressively as the blade moves downwardly, thus tearing the stock progressively along the perforation from one edge of the strip to the opposite edge. The angle which the blade edge forms with the card stock plane at first contact should be as small as possible to minimize the length of the blade stroke required, but large enough to ensure smooth and relatively easy tearing. An angle of from around ten to thirty degrees has been found to be satisfactory.

It has been found that this arrangement is very advantageous in that it accurately tears the cards apart at the perforations even when the burster blade is not accurately aligned with the perforation. It has been found that the blade can be positioned as much as a quarter of an inch on either side of the perforation and still create effective tearing along the perforation line.

The stepping motor 64 is reversible. As soon as the burster has finished, the motor 64 is run in the reverse direction (counterclockwise) for a few steps to cause the newly-freed card 122 to move forward by a small distance, while the succeeding card and the rest of the card stock remains stationary.

Upon the reversal of the motor 64, the clutches for rollers 100 disengage, while the clutches for rollers 110 engage to grip the newly-freed card and pull it forward. The clutch on roller 72 also is released at this time, so that none of the infeed rollers 100, 92, 72 or 80 is driven by the motor 64 when it is rotating in a counterclockwise direction. The rollers 100, 92 rotate freely in response to the pulling of the card 122 by the outfeed rollers.

The freed card moves forwardly until its trailing edge passes the sensor 168, which detects the gap created by a properly separated card. If a gap does not appear, then the machine shuts down, as noted above.

The detection of a proper gap enables the print feed circuitry to feed the freed card 122 forwardly when a signal comes indicating that the printer is ready to print a ticket.

When the print feed signal is received, the drive motor 164 again rotates in the counterclockwise direction until it has fed the freed card into the printer, which then pulls the card forward past the sensor 162 to indicate that a card has been properly fed. The stepping motor then stops and waits for an instruction to start the next cycle.

CARD HOLDING MEANS

In accordance with one of the features of the present invention, the two sets of infeed rollers are provided with means to insure that the downward force created by the burster blade on the strip of cardstock material when the blade passes through the strip will not pull the card stock longitudinally. This is accomplished, in effect, by drivably coupling the rollers in the two sets of infeed rollers together so that they cannot both rotate in opposite directions at the same time.

Referring again to FIG. 8, the tension forces in the card stock created by the downward movement of the burster blade 126 through the stock are indicated by the arrows labeled "T" in FIG. 8. As it can be seen, the tension forces tend to rotate rollers 100 and 80 in a counterclockwise direction and rollers 92 and 72 in a clockwise direction. This direction of rotation of the rollers causes the clutches for rollers 100, 92 and 80 to lock so that the rollers cannot rotate in response to the tension forces. Although the clutches for rollers 72 do not prevent rollers 72 from rotating under the tension forces, because rollers 72 are drivably coupled by means of belt 118 to the shaft 98, and since rollers 100 are locked against rotation, rollers 72 also are locked against rotation. Thus, the card stock is held firmly in position where it will be torn quickly and cleanly and will not move longitudinally under the impact of the burster blade.

It should be understood that, in a simpler drive arrangement, where one way clutches are not needed, the drive rollers can be coupled together by the simple use of toothed belts and pulleys to insure that the card stock is held firmly.

In any event, the tension forces ultimately are transferred to the belts 118 and 120, which do not stretch appreciably, so as to assure stability of position of the card stock while it is being burst.

The above-described drive system also is highly advantageous in that it uses but a single motor, a relatively inexpensive stepping motor, to drive not only the infeed rollers, but also to drive the outfeed rollers separately from the infeed rollers so as to leave the incoming card stock stationary while moving the freed card forwardly. This significantly reduces the cost and size of the mechanism compared with what it would be if a separate motor were used for each task.

BURSTING MECHANISM

The bursting mechanism is indicated generally at 124 in FIGS. 4 and 5. It includes a small DC motor 128 with a toothed pulley 132 (see FIG. 5) and a toothed belt 134 driving a toothed pulley 136 which operates a crank 150 through a wrap-spring clutch 138. The crank 150 has a crank arm 148 which is pivotably connected to the burster blade 126. The burster blade 126 is pivoted at 152 to a supporting bracket 146 (see FIG. 4). It has a counterweight 156 at its left end to help restore the blade to its raised position.

Referring to FIG. 5, there is provided a solenoid 142 which has a plunger 144 which normally is in a raised vertical position where it engages the tang 140 of the wrap-spring clutch 138 (see FIG. 6).

The operation of the burster mechanism 124 is as follows: at the start of a bursting operation, a pre-determined number of stepping motor steps in advance of the bursting position, the DC motor 128 is started. It rotates the wheel 136 but does not turn the crank 150 at this time because the plunger 144 engages and holds the tang 140 to disengage the wrap-spring clutch 138. After a brief delay allowing the motor to reach full speed, at the precise instant when the stepping motor step count reaches the correct number, the solenoid 132 retracts its plunger 144 to free the tang 140 and allow the clutch 138 to drive the crank 148 and the blade 126. The plunger 144 quickly returns to its upward position so that, after the crank has made one revolution, the clutch 138 again is disengaged and the burster blade stops. Thus, the burster blade has made one reciprocating movement downwardly to burst the card stock, and then upwardly to its rest position.

It should be understood that other bursting motions could be used as alternatives.

First, as it has been described above, the bursting motion takes place while the strip of ticket blanks is stationary. It also is possible to do the bursting or separation of the cards from one another while they are moving continuously. One way in which this can be done is to cause the motion of the bursting blade downwardly to create one burst and then upwardly to create the next one, with the next downward motion creating the subsequent burst, and so forth. In other words, the bursting motion occurs both on the upstroke and downstroke of the burster blade. The advantage of this is not only that it enables continuous motion of the strip, but also that it creates an economy of motion. The dual-direction bursting motion also can be used in the embodiment in which the cardstock strip is stationary during bursting.

Figure 9:
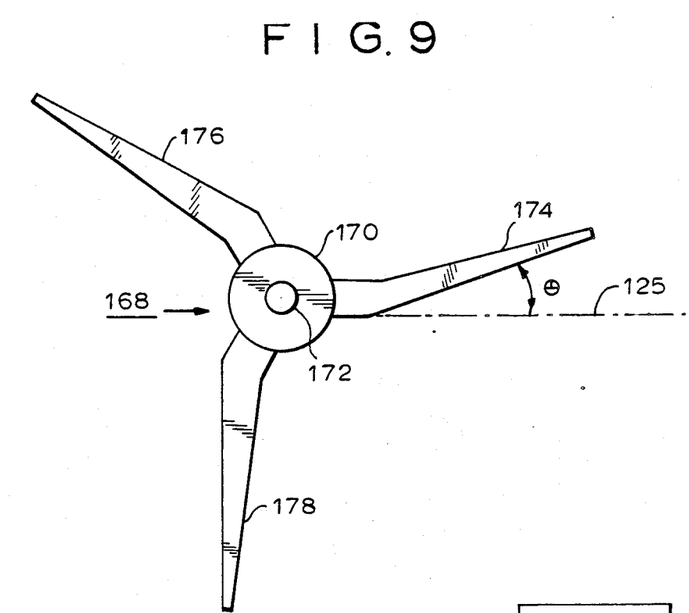
FIG. 9 is an elevation view, partially schematic, of a modified component for the burster mechanism of FIGS. 3 through 8.

This embodiment of the invention can be implemented easily by using a wrapping clutch with two release tangs 140 and 141 (see FIG. 6) located 180° apart, and ensuring that the position of blade 126 relative to the plane of card travel is correct to make a clean tear on the upstroke An alternative burster blade mechanism 168 is shown in FIG. 9. The mechanism 168 includes a hub 170 secured to a drive shaft 172 driven continuously and synchronously by a drive motor (not shown). Extending from the hub 170 are three burster arms 174, 176 and 178, sybstantially the same as the burster blade 126.

The movement of the strip and the burster blade mechanism 168 shown in FIG. 9 are synchronized so that each blade passes through the path of the card stock at precisely the right time to create bursting along a perforation.

The burster mechanism of the present invention is extremely reliable. Because the burster blade need not hit the blank strip at precisely the location of the perforation in order to correctly separate the cards, bursting failures are minimized. Furthermore, since the mechanism tears the ticket blanks apart rather than cutting them apart as in some prior bursters, each card or blank is of the same length as determined by the perforating machine which forms the blanks, and any slippage of the stock in the feeding mechanism does not result in one blank being cut longer than the others. Therefore, uniformity of ticket blank size is another significant advantage of the burster mechanism of the present invention.

The burster mechanism also is fast-acting, simple, and quiet in operation.

COLLECTOR MECHANISM

Figure 11:
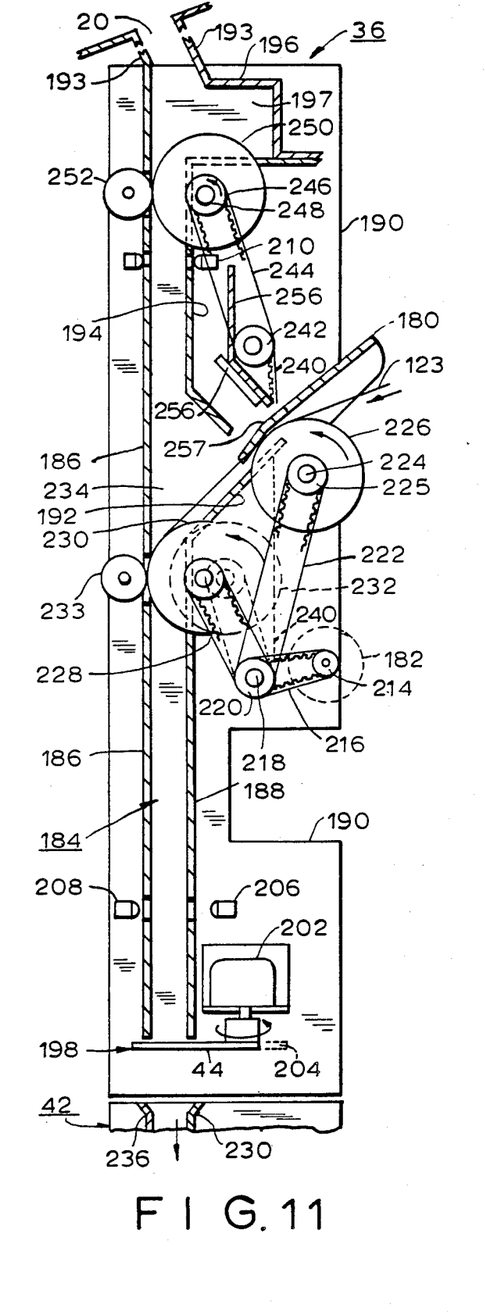
FIG. 11 is a side elevation cross-sectional view of the "escrow bin" or card storage compartment and ticket issuing mechanism of the device shown in FIGS. 1 through 10.
Figure 12:
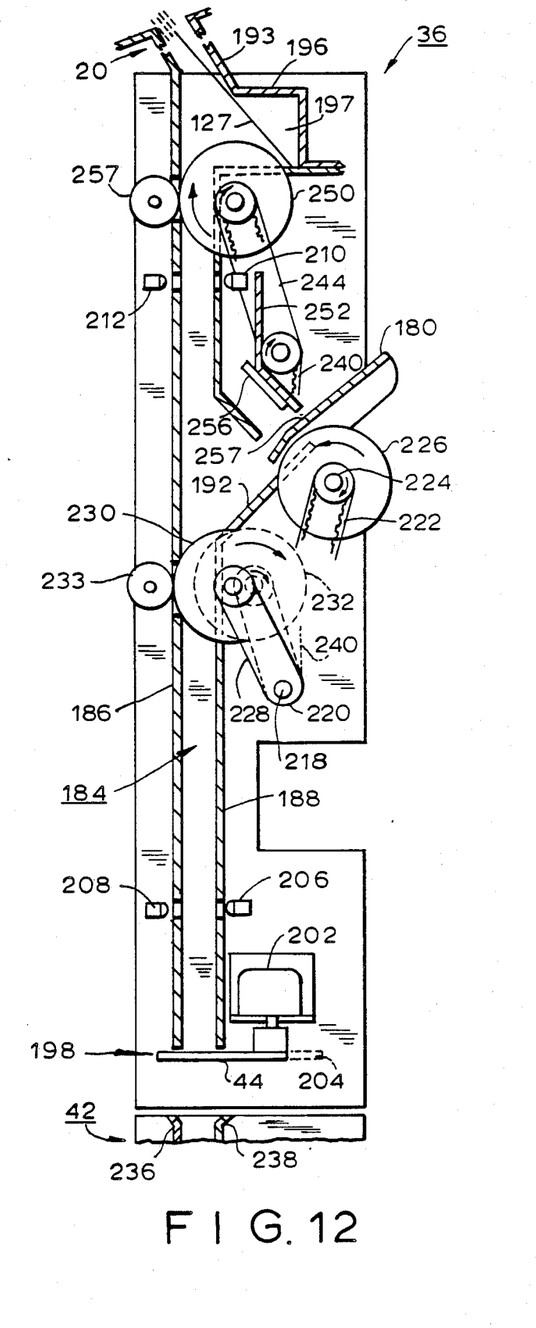
FIG. 12 is a view like that of FIG. 11, demonstrating operation of the machine in issuing tickets.

FIGS. 11 and 12 show the collector mechanism 36 and its operation. Referring to FIG. 11, as the ticket 123 most recently printed emerges from the print engine 30, a guide 180 (also see FIG. 3) guides the ticket into contact with a feed roller 226 rotatably mounted on a shaft 224 driven by a toothed belt 222 meshing with a toothed pulley 225 secured to the shaft 224. Belt 222 meshes with a toothed pulley on a drive shaft 218 driven by a toothed belt 216 and a toothed pulley 214 on the drive shaft of a drive motor 182. The guide 180 is bent downwardly at its lower left end. This causes the ticket to bend so that it makes intimate contact with the surface of the roller 226, even though the space between the roller 226 and the guide 180 is considerably larger than the thickness of the card stock. This drives the ticket 123 downwardly into a vertical compartment 184 which serves as the collector of printed tickets. The compartment 184 consists of front and rear side walls 186 and 188, as well as end plates 190 (FIG. 11) and 191 (FIG. 3).

The infeed roller 226 is connected to its shaft through a one-way clutch so that it rotates only during the infeed operation, when the drive motor is rotating in a counterclockwise direction, as shown in FIG. 11. It does not rotate during the outfeed operation, as shown in FIG. 12.

An optical sensor 256 detects the movement of the incoming ticket 123 through a hole 257 in order to detect any jam condition during incoming ticket travel.

As it has been stated above, the bottom of the compartment 184 is formed by the gate member 44 forming part of a gate mechanism 198. The gate mechanism 198 includes a rotary solenoid 202 which is attached to the gate member. The solenoid 202 rotates the gate member through 90° to bring it to a position indicated by dashed lines 204 to open the bottom of the compartment 184 to allow cards in an incomplete batch to drop downwardly to the safe storage receptacle 42 which includes side walls 236 and 238.

The tickets coming into the compartment 184 impinge either on the front side wall 186 or on the surface of a card 234 already in position, and make contact with a roller 230 which forces the card downwardly to the bottom of the compartment.

The roller 230 is spring-loaded and is urged against the stack 234 of cards forming in the compartment. When there are no cards in the compartment, the roller 230 rotates against an idler 233.

The roller 230 is driven by a toothed belt 228 from a toothed pulley on the shaft 218 and thus is driven by the drive motor 182. Rotation during infeed of tickets into compartment 184 is in the direction of the arrow on the roller 230 in FIG. 11. As the thickness of the stack of tickets 234 in the compartment increases, the roller 230 moves to the right to a position indicated at 232 in dashed outline. Thus, the roller 232 maintains driving contact with the outermost card in the stack 234. Photocells 206 and 208 detect the presence or absence of cards in the storage compartment.

In FIG. 11, it is to be noted that the upper edge of each of the tickets in the stack 234 in the storage compartment is above the entering point of any new ticket into the stack, thus preventing any binding between the incoming tickets and existing tickets to insure smooth movement of the tickets into the compartment.

REJECTION OF INCOMPLETE BATCHES

The computer in the printer counts the cards or tickets stored in the compartment 184 and compares that number with the number of tickets in the batch being printed. When a batch should have been completed but has not been, the computer in the printer senses this condition and causes the tickets to be delivered downwardly into the safe storage receptacle 42. A signal is sent by the control circuitry to the rotary solenoid 202 which moves the gate 44 out of the way and allows the still-rotating roller 230 to thrust the cards downwardly into the receptacle 42 for safe storage and accounting. By this means, incomplete batches are not delivered to the customer and are saved so that they can be accounted for in the future.

ISSUING TICKETS

FIG. 12 illustrates how the tickets from a batch are issued to the customer when the batch is complete. An outfeed drive roller 250 is provided. (Actually, roller 250 comprises a pair of spaced rollers, as do rollers 226 and 30 and all the rollers shown in FIGS. 7 and 8). Roller 50 is driven by a toothed belt 244 which is driven by a toothed pulley driven from the main drive shaft by a toothed belt 240 (also see FIG. 3).

The drive motor 182 is reversible. It now reverses direction, and the roller 230, which bears against the outermost ticket in the stack 234, moves that ticket upwardly into the nip between the roller 250 and its idler 52. The roller 250 is mounted to the shaft by a one-way clutch which now is engaged, but was idling when the motor 82 was turning in the other direction. This causes the upper end of ticket 127 to be forced upwardly out through the outlet chute 193, which is angled to the left as shown in FIGS. 11 and 12, and extend out of the opening 20. The outlet chute actually is longer than shown, but is shown in truncated form for the sake of compactness in the drawings.

As the ticket moves upwardly, it rides over the rotating upper surface of roller 250 which forms part of the bottom of an output storage compartment 197 formed by a wall 196. The rotation of the roller 250 thrusts each successive card into a stack aligned in the same order in which the tickets were printed, with the upper ends 127 of the tickets extending outwardly through the dispensing opening in the housing.

A pair of photocells 210 and 212 detect the presence or absence of a ticket in the passageway between the rollers 230 and 250, for control purposes in the machine.

The stacking of the cards at an angle as shown in FIG. 12 in the compartment 197 provides a angled surface against which the upcoming card bears so as to insure smooth, jam-free feeding of the tickets out of the machine.

When both the upper and lower photocells 210, 212, 208 and 206 indicate that no tickets are present, then the drive motor 182 stops and waits for instructions to start another operation.

MAGNETIC RECORD EMBODIMENT

Figure 13:
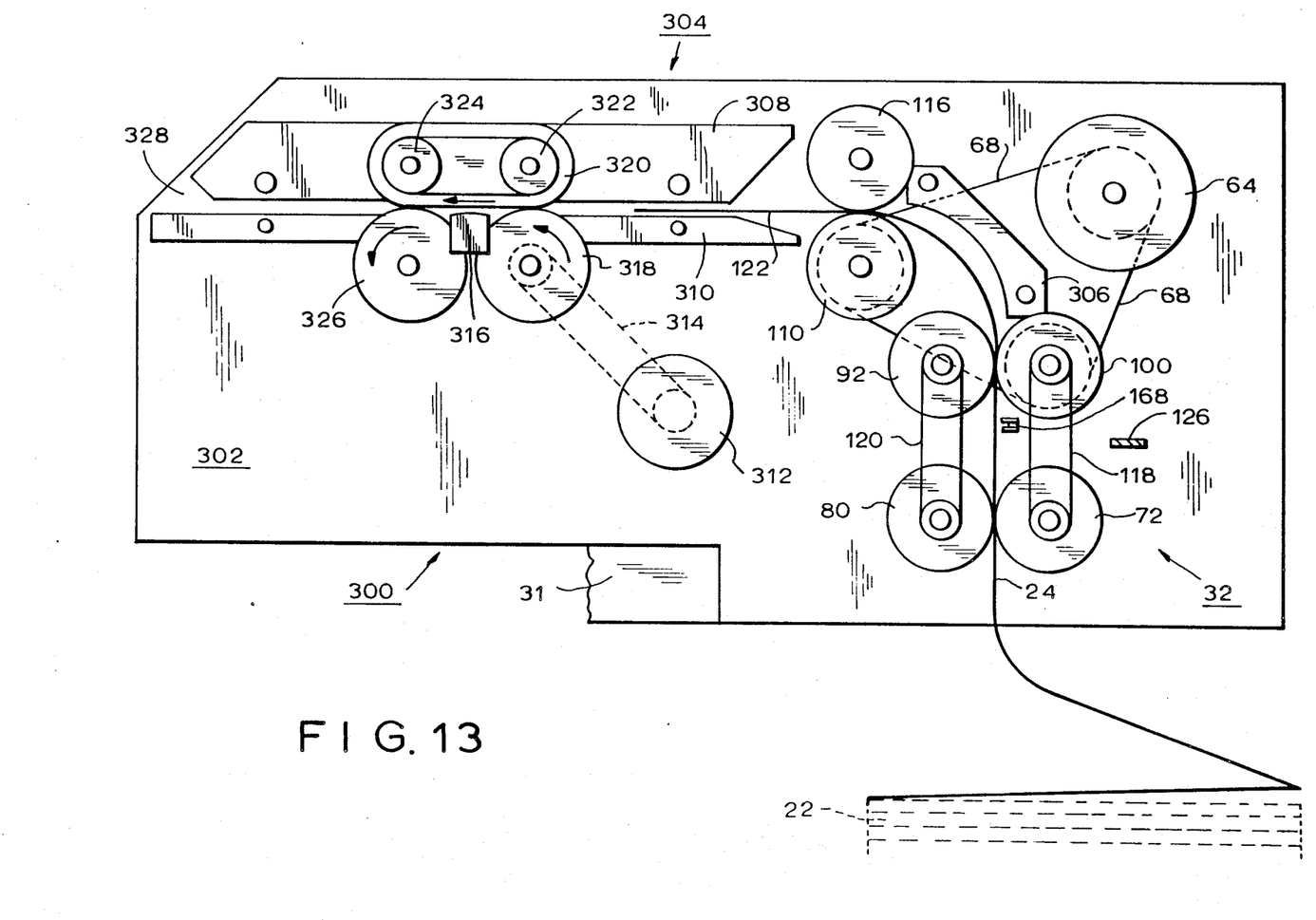
FIG. 13 is a side elevation view, like that of FIG. 8, showing an alternative embodiment of the invention.

FIG. 13 is a partially schematic view showing a portion of a printer modified to record data and read data from a longitudinal magnetic strip (not shown) on the rear side of the ticket blanks. Ticket blanks with such magnetic strips are shown in the above-identified patent application Ser. No. 051,046 filed May 15, 1987. The data recorded on and read from such a stripe can be the same as that described in the foregoing prior patent application.

The burster/feeder and magnetic recording/reading assembly 300 shown in FIG. 13 includes the burster/feeder mechanism 32 of FIGS. 3 and 4-8 mounted on a pair of side plates 302. Only one side plate 302 is shown in FIG. 13. The other has been removed to show the internal structure of the assembly 300.

The mechanism 32 of FIGS. 3 and 4 through 8 has been modified by rotating the first two roller pairs at the input through 90°, and moving the unit 32 to a position over the stack 22 of fan-fold card stock, and adding curved guide-members 306 to guide the card 122 through a 90° bend to feed it into the nip of the rollers 116 and 110.

The card 122 is fed out of the unit 32 into the magnetic recording/reading unit 304 which also is mounted between plates 302.

The unit 304 includes input guides 308 and 310, a magnetic record/read head 316, a drive motor 312 with a rotary position encoder wheel (not shown) driving a toothed belt 314 which drives a pair of rollers 318. A belt 320 rotates on a pair of idlers 322 and 324 whose shafts are aligned along a line parallel to the path of travel of the card 122 through the guides 308, 310. The belt 320 presses against the rollers 318 and the pair of rollers 346 so that the belt is driven by the card through the rollers 318 and drives the roller 326. The magnetic head 316 is located between the rollers 318 and 326.

The card 122 leaves the magnetic record/read unit 304 through an outlet 328 and moves into the print engine 30 to be printed.

The card feed arrangement shown in FIG. 13 is advantageous in that the card 122 itself drives the belt 320 and the roller 326. This assures that the surface of the roller 326 travels at the same speed as the card 122. This eliminates "jitter" which might adversely affect the magnetic recording and reading of information to and from the card and which otherwise might result from the leading edge of the card hitting the roller 326 if it were traveling at a speed different from that of the card.

For example, if there were slippage between the drive roller 318 and the card, it would not create a difference between the speed of the surface of the roller 326 and the card.

In conclusion, it can be seen that the above-described preferred embodiment of the invention satisfies the objectives set forth above. It provides a relatively simple low-cost high-speed highly reliable mechanism for printing tickets or similar documents from continuous fan-fold stock. It provides a highly desirable ticket vending terminal which can either stand alone or be integrated with other equipment in a convenient location. The mechanism used to separate ticket blanks from one another to be printed is relatively simple and trouble free, and yet maintains the length of the separated tickets accurately uniform.

The escrow storage arrangement insures that printed tickets will not be delivered to the customer until an entire batch has been printed completely. If not, the incomplete batch is ejected into a safe storage bin where the tickets can be accounted for.

The tickets are ejected from the machine in a smooth, trouble-free operation.

Magnetic recording and reading in the unit shown in FIG. 13 is smooth and essentially jitter-free.

The above description of the invention is intended to be illustrative and not limiting. Various changes or modifications in the embodiments described may occur to those skilled in the art and these can be made without departing from the spirit or scope of the invention. For example, although the print engine 30 preferably is an ion deposition type of device, other print engines also are usable. One example of such other print engine is a laser print engine.

I claim:

1. A printer for printing information on individual sheets in a strip in which said sheets are fastened sequentially to other sheets at separation lines where said sheets are weakened for ease of separation, said printer comprising, in combination, a print engine, sheet separator means, feed means for feeding said strip into said separator means, detecting means for detecting each of said separation lines, holding means for holding said sheets against longitudinal motion due to lateral distortion of said sheets in the vicinity of said separation lines during separation, and means for passing a separation member through said sheet in the vicinity of said separation lines so as to separate said sheets from one another along said lines.

2. Apparatus as in claim 1 including means for storing said strip in fan-fold form, with the sheets being folded along said separation lines.

3. Apparatus as in claim 2 in which said separation member has a dull edge and is adapted to make contact with said strip progressively, starting at one edge and finishing at the opposite edge of said sheet to separate said sheets along each separation line.

4. Apparatus as in claim 1 in which said holding means comprises at least one pair of rollers for gripping and moving said sheets, said rollers being spaced apart in the direction of longitudinal movement of said sheets, and coupling means for drivably coupling said rollers together so that they will not rotate in directions opposite to one another.

5. Apparatus as in claim 4 in which said coupling means includes shafts for said rollers, toothed pulleys secured to said shafts, and a toothed belt engaging said pulleys.

6. Apparatus as in claim 1 in which said detecting means comprises means for detecting the position of the leading edge of a sheet, means for determining the distance to drive said sheet past said position to bring the next separation line into separation position, means for moving said strip for said distance, and means for activating said separator means when said strip has traveled said distance.

7. Apparatus as in claim 1 including means for stopping said strip when a separation line reaches said separator means, and outfeed means for moving at least the separated sheet towards said print engine upon completion of the separating action.

8. Apparatus as in claim 1 in which said bursting mechanism includes a multi-arm rotary separator blade, and means for rotating said blade rapidly to make each separation movement, and means for timing the movement of said blade relative to each separation line so as to create bursting while said sheets are moving through said mechanism continuously.

9. Apparatus as in claim 1 in which said separator means comprises a dull blade pivotably mounted laterally of the path of travel of said strip to pivot about a pivot point, and drive means for moving said blade with a reciprocating motion through said path in a direction transverse to the direction of motion of said strip.

10. Apparatus as in claim 9 in which said drive means includes a crank pivoted to said blade, a drive motor, and an electrically-operable single-revolution clutch coupling said drive motor to said crank.

11. Apparatus as in claim 1 in which said sheets are elongated ticket blanks, particularly airline ticket blanks, and said print engine is selected from the group consisting of ion deposition and laser print engines.

12. Apparatus as in claim 1 in which said feed means includes a reversible drive motor, infeed roller means drivably coupled to said drive motor through a one-way clutch to feed said strip into said separator means when said motor rotates in a first direction, and to idle when said motor rotates in the opposite direction, outfeed roller means for feeding a separated sheet out of said separator means, said outfeed roller means being drivably coupled to said drive motor through a one-way clutch to feed out said separated sheet when said motor rotates in said opposite direction, and to idle when said motor rotates in said first direction.

13. Apparatus as in claim 12 in which said holding means includes second infeed roller means spaced downstream from the first-named infeed roller means, said separation member being located between said first and second infeed roller means, and drive coupling means for coupling said first and second infeed roller means together to prevent rotation thereof in opposite directions 14. Apparatus as in claim 13 in which each of said infeed roller means comprises first and second meshed gripping drive rollers, each mounted on its own shaft through a one-way clutch, the operating directions of the clutches of said first infeed roller means being opposite, and the operating directions of the clutches of said second infeed roller means being the same, said drive coupling means comprising a plurality of toothed pulleys, each attached to one end of each of said shafts, and a pair of toothed drive belts, one engaged with the pulleys on the shafts of the first drive rollers and the other engaged with the pulleys on the shafts of the second drive rollers, at least one of the rollers of each roller means being made of a relatively soft, high-friction material to grip said sheets securely.

15. Apparatus as in claim 7 including gap detector means for detecting a gap between said separated sheet and said strip and for enabling said outfeed means in response to detection of said gap.

16. Apparatus as in claim 1 in which each of said sheets has a magnetic recording area thereon, and including magnetic recording/reading means positioned between said sheet separator means and said print engine for recording and reading data to and from said recording area.

17. Apparatus as in claim 16 in which said recording/reading means includes a drive motor coupled to drive roller means for engaging said sheet, drive belt means for rotating when said sheet is driven by said drive roller means and having a belt contacting said sheet, and idler roller means driven by said sheet, and magnetic transducer means contacting said magnetic area of said sheet at a location between said drive roller means and said idler roller roller means.

18. A ticket printer for printing and issuing elongated, relatively narrow tickets, said printer comprising data printing means for printing information on ticket blanks, fan-fold ticket blank storage means for storing fan-folded strips of individual ticket blanks which are linked to sequential blanks along perforated lines, separating means for withdrawing said blank tickets from said storage means and separating them by tearing them apart along the perforations, means for feeding the separated blank tickets into said printing means, said separating means comprising means for passing a separating member through said strip transversely thereof adjacent said perforated lines 19. Apparatus as in claim 18 including means for holding said strip in place while said separating member is passing through said strip.

20. Apparatus as in claim 18 including a housing around said printer, said housing having a ticket-issuing opening, and including accumulator means in said housing for accumulating separate printed tickets in a multi-ticket batch being printed and holding said tickets safely in said housing until said batch is complete, and issuing means for issuing said tickets in said batch through said opening only when said batch is complete.

21. Apparatus as in claim 18 including data and payment entry means for receiving and verifying payment for said tickets by a purchaser-operator and printing transportation information on at least one ticket blank, said information corresponding to the data entered by said purchaser-operator.

22. A ticket printer for printing and issuing tickets, fan-fold ticket blank storage means for storing strips of individual ticket blanks linked to sequential blanks and being folded at perforated lines, burster means for withdrawing said blank tickets from said storage means and bursting them apart along said perforated lines, means for feeding the separated ticket blanks into printing means, printing means for printing information on said ticket blanks to form complete tickets, and accumulator means for accumulating printed tickets in a given batch of tickets in a safe location inside said printer until it is determined that the batch is complete, and then issuing tickets outside said printer machine when the batch is complete.

23. Apparatus as in claim 22, including data and payment entry means for receiving and verifying payment for said tickets by a purchaser-operator and printing transportation information on at least one ticket blank, said information corresponding to the data entered by said purchaser-operator.

24. A printing method for printing information on separate sheets forming a strip in which successive sheets are delineated by weakened linear areas across said strip, said method comprising the steps of moving said strip through a separator mechanism by means of rollers, providing a separator member with means for moving said member rapidly through the path taken by said strip, moving said member through said strip at a time when the blade is positioned properly relative to a weakened linear area, while utilizing said rollers to hold said sheets against longitudinal movement due to movement of the separator member through said strip, and printing on the separated sheets.

25. A method as in claim 24 in which said separator member is moved through said path while forming an angle with the plane of said strip so as to tear said sheets apart along said line progressively from one edge to the opposite edge of said strip.

26. A method as in claim 24 including the step of providing drive rollers on opposite sides of a bursting position at which said separator member is located, and driveably coupling said rollers together so that they must cannot rotate in opposite directions simultaneously.

27. A method as in claim 22 in which the separator member is one of a plurality of same which are mounted on a rotary member, and including the steps of rotating said rotary member to cause said separator members to pass through said path sequentially at precisely determined instants of time so as to sequentially break said sheets apart along said linear areas while said sheet is moving continuously.

28. A printer for printing tickets in batches, each batch containing a predetermined number of documents, said printer comprising, in combination, a housing with a ticket outlet, printing means in said housing, feed means for feeding documents into said printing means and out of said printing means when printed, collection means for collecting the documents in a given batch in a storage compartment, means for counting said documents and determining when all the documents in a given batch have been collected, and means for issuing the documents in said batch to the outside of said housing through said ticket outlet.

29. A printer as in claim 28 including means for detecting when an incomplete batch of documents has been printed, delivering documents collected in an incomplete batch to a safe storage receptacle in said machine in response to the detection of the incomplete batch.

30. Apparatus as in claim 29 in which said compensation receiving means is selected from the group consisting of means for reading a credit card and charging to the account of the holder of said card the compensation amount; paper currency accepting means for accepting and counting paper currency; and data input means to input credit information.

31. A printer as in claim 28 including data and compensation input means, and prompting means with instruction display means operable by ticket purchasers to input data and compensation to create, pay for and issue tickets themselves.

32. A printer as in claim 28 in which said collection means includes a container for collecting documents in a batch and aligning them in a generally vertical orientation, and means for moving said documents generally vertically upwardly to exit said housing, or vertically downwardly into a safe storage container, in the case of a given batch which is incomplete.

33. A printer as in claim 28 in which said collection means includes infeed roller means, a reversible feed motor for rotating said infeed roller means in one direction to feed documents longitudinally into said storage compartment, and to rotate said infeed roller means in the opposite direction to feed said documents longitudinally towards said outlet.

34. A printer as in claim 33 including a safe storage receptacle located adjacent one end of said compartment for receiving documents from an incomplete batch, and gate means operable to selectively admit documents from said compartment into said receptacle.

35. A printer as in claim 34 in which said compartment is substantially vertical and said gate forms the bottom thereof, with said receptacle being aligned with and below said compartment.

36. A printer as in claim 33 in which the distance from said documents, when stored in said compartment, to said outlet is relatively long, and including further roller means adjacent said outlet for driving said documents through said outlet.

37. A printer as in claim 33 including means forming a dispensing receptacle adjacent said outlet, and including means for stacking the documents to be issued in said dispensing receptacle with one end of each document graspable by a person using said printer.

38. A printer as in claim 37 in which said compartment is substantially vertical and is below said dispensing receptacle, and said stacking means comprises outlet roller means forming part of the bottom wall of said dispensing receptacle, whereby said roller stacks said documents in a location out of the way from other documents being fed into said dispensing receptacle.

39. Magnetic recording/reproducing means for recording data on or reproducing data from magnetic recording area—bearing sheets, said recording/reproducing means comprising, in combination, guide means for guiding said sheets along a path, magnetic transducer means positioned adjacent said path to record said data on or reproduce said data from said magnetic area of said sheet as it moves along said path past said transducer means, drive means including a drive motor drivably coupled to a drive roller, belt means including at least one belt mounted on rollers and having one surface parallel to said path and pressing against said drive roller near one end of said belt, an idler roller pressing against said belt adjacent its other end, said transducer means being located intermediate said drive roller and said idler roller.

40. Apparatus as in claim 39 in which said sheet is a relatively stiff ticket blank, said ticket blank driving said belt and said idler roller, under the motive force of said drive roller, to ensure that the surface of said idler roller moves at the same speed as said blank, said guide means being positioned to guide said blank into the nip between said drive roller and said belt, and said idler roller and said belt.

* * * * *